United States Patent
Kweon et al.

(10) Patent No.: US 9,763,083 B2
(45) Date of Patent: Sep. 12, 2017

(54) METHOD AND APPARATUS FOR MANAGING MOBILITY OF TERMINAL IN COMMUNICATION SYSTEM

(71) Applicant: Samsung Electronics Co., Ltd, Gyeonggi-do (KR)

(72) Inventors: Ki-Suk Kweon, Gyeonggi-do (KR); Jung-Shin Park, Seoul (KR); Yeong-Moon Son, Gyeonggi-do (KR); Antony Franklin, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 14/137,846

(22) Filed: Dec. 20, 2013

(65) Prior Publication Data

US 2014/0179315 A1    Jun. 26, 2014

(30) Foreign Application Priority Data

Dec. 21, 2012 (KR) .......................... 10-2012-0150900

(51) Int. Cl.
*H04W 60/00* (2009.01)
*H04W 68/08* (2009.01)
(Continued)

(52) U.S. Cl.
CPC .................................... *H04W 8/26* (2013.01)

(58) Field of Classification Search
CPC .. H04W 36/00; H04W 36/12; H04W 36/0005
See application file for complete search history.

(56) References Cited

U.S. PATENT DOCUMENTS 7,672,288 B1 * 3/2010 Iartym .............. H04L 29/12216
                                                        370/349
2004/0176095 A1 9/2004 Yamada et al.
(Continued)

FOREIGN PATENT DOCUMENTS

EP              1464151          9/2006
KR    2009 0022151 A1          3/2009
(Continued)

OTHER PUBLICATIONS

International Search Report dated Feb. 25, 2014 in connection with International Patent Application No. PCT/KR2013/011786, 3 pages.
(Continued)

*Primary Examiner* — Joseph Dean, Jr.

(57) ABSTRACT

A method and apparatus for managing mobility of a terminal by a first base station in a communication system. The first base station assigns a first address to the terminal located in a cell managed by the first base station and establishes a session to an external server that communicates with the terminal using the first address. If the terminal moves to a cell managed by a second base station different from the first base station, the first base station determines whether information about a second address assigned to the terminal by the second base station is received within a predetermined time. Upon receiving the information about the second address within the predetermined time, the first base station transmits data received from the external server to the terminal through the second base station using the information about the second address.

20 Claims, 6 Drawing Sheets

(51) Int. Cl.
*H04W 4/02* (2009.01)
*H04W 8/26* (2009.01)

(56) References Cited

U.S. PATENT DOCUMENTS

| | | | |
|---|---|---|---|
| 2006/0083209 A1* | 4/2006 | Saint-Hilaire | H04L 29/12009 370/338 |
| 2006/0206597 A1* | 9/2006 | Kim | H04L 29/12311 709/220 |
| 2008/0171548 A1 | 7/2008 | Tsirtsis et al. | |
| 2009/0201886 A1* | 8/2009 | Lee | H04L 47/10 370/335 |
| 2012/0182936 A1 | 7/2012 | Haddad et al. | |

FOREIGN PATENT DOCUMENTS

| WO | WO 2011/106670 A2 | 9/2011 |
|---|---|---|
| WO | WO 2011/153415 A1 | 12/2011 |

OTHER PUBLICATIONS

Written Opinion of International Searching Authority dated Feb. 25, 2014 in connection with International Patent Application No. PCT/KR2013/011786, 5 pages.

Extended European Search Report dated Jul. 8, 2016 in connection with European Application No. 13865158.3, 10 pages.

D. Johnson, et al., "Mobility Support in IPv6; draft-ietf-mobileip-ipv6-20.txt", MPEG Meeting, Mar. 16-23, 2011, Geneva, Switzerland, 169 pages.

* cited by examiner

METHOD AND APPARATUS FOR MANAGING MOBILITY OF TERMINAL IN COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Dec. 21, 2012 and assigned Serial No. 10-2012-0150900, the entire disclosure of which is incorporated herein by reference.

TECHNICAL FIELD

The present disclosure relates to a method and apparatus for managing mobility of a terminal in a communication system.

BACKGROUND

In a mobile communication network, due to the mobility of terminals, the network needs to constantly monitor locations of the terminals, and seamlessly forward data transmitted from an external network to the terminals. Managing locations of terminals is referred to as mobility management for terminals, and in the conventional mobile communication network, a centralized approach based on the hierarchical network structure is used as mobility management technology. In the centralized approach, a mobility agent managing mobility for terminals is located in a core network. For example, a Packet Data Network (PDN) Gateway (P-GW) is used as a centralized mobility agent in a 3rd Generation Partnership Project (3GPP) System Architecture Evolution (SAE) network, and a Gateway GPRS Support Node (GGSN) is used as a centralized mobility agent in a Universal Mobile Telecommunication System (UMTS) network.

The use of these centralized mobility agents may cause inefficiencies of routing routes, the 'single point of failure' defects of the centralized mobility agents, traffic centralization in the core network, and the like.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for managing mobility of a terminal in a communication system.

Another aspect of the present disclosure is to provide a method and apparatus for efficiently performing binding update for terminal mobility management in a communication system.

In accordance with an aspect of the present disclosure, there is provided a method for managing mobility of a terminal by a first base station in a communication system. The method includes assigning a first address to the terminal located in a cell managed by the first base station, and establishing a session to an external server that communicates with the terminal, by using the first address; if the terminal moves to a cell managed by a second base station different from the first base station, determining whether information about a second address assigned to the terminal by the second base station is received within a predetermined time; and if the information about the second address is received within the predetermined time, transmitting data received from the external server to the terminal through the second base station using the information about the second address.

In accordance with another aspect of the present disclosure, there is provided a method for transmitting information for mobility management by a terminal in a communication system. The method includes receiving a first address assigned from a first base station, if the terminal is located in a cell managed by the first base station; receiving data provided by an external server from the first base station based on the first address; if the terminal moves to a cell managed by a second base station different from the first base station, receiving a second address assigned by the second base station, and transmitting information about the second address to the first base station within a predetermined time; and receiving data provided by the external server from the first base station through the second base station, based on the information about the second address. The first address may be used by the first base station to establish a session to the external server and receive data from the external server through the established session.

In accordance with further another aspect of the present disclosure there is provided a first base station in a communication system. The first base station includes a receiver; a transmitter; and a controller configured to; assign a first address to a terminal located in a cell managed by the first base station, and establish a session to an external server that communicates with the terminal, by using the first address; if the terminal moves to a cell managed by a second base station different from the first base station, determine whether information about a second address assigned to the terminal by the second base station is received at the receiver within a predetermined time; and if the information about the second address is received within the predetermined time, control the transmitter to transmit data received from the external server to the terminal through the second base station using the information about the second address.

In accordance with yet another aspect of the present disclosure there is provided a terminal in a communication system. The terminal includes a receiver; a transmitter; and a controller configured to; receive a first address assigned from a first base station, if the terminal is located in a cell managed by the first base station; receive data provided by an external server from the first base station through the receiver based on the first address; if the terminal moves to a cell managed by a second base station different from the first base station, receive a second address assigned by the second base station, and control the transmitter to transmit information about the second address to the first base station within a predetermined time; and control the receiver to receive data provided by the external server from the first base station through the second base station, based on the information about the second address. The first address may be used by the first base station to establish a session to the external server and receive data from the external server through the established session.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The present disclosure includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
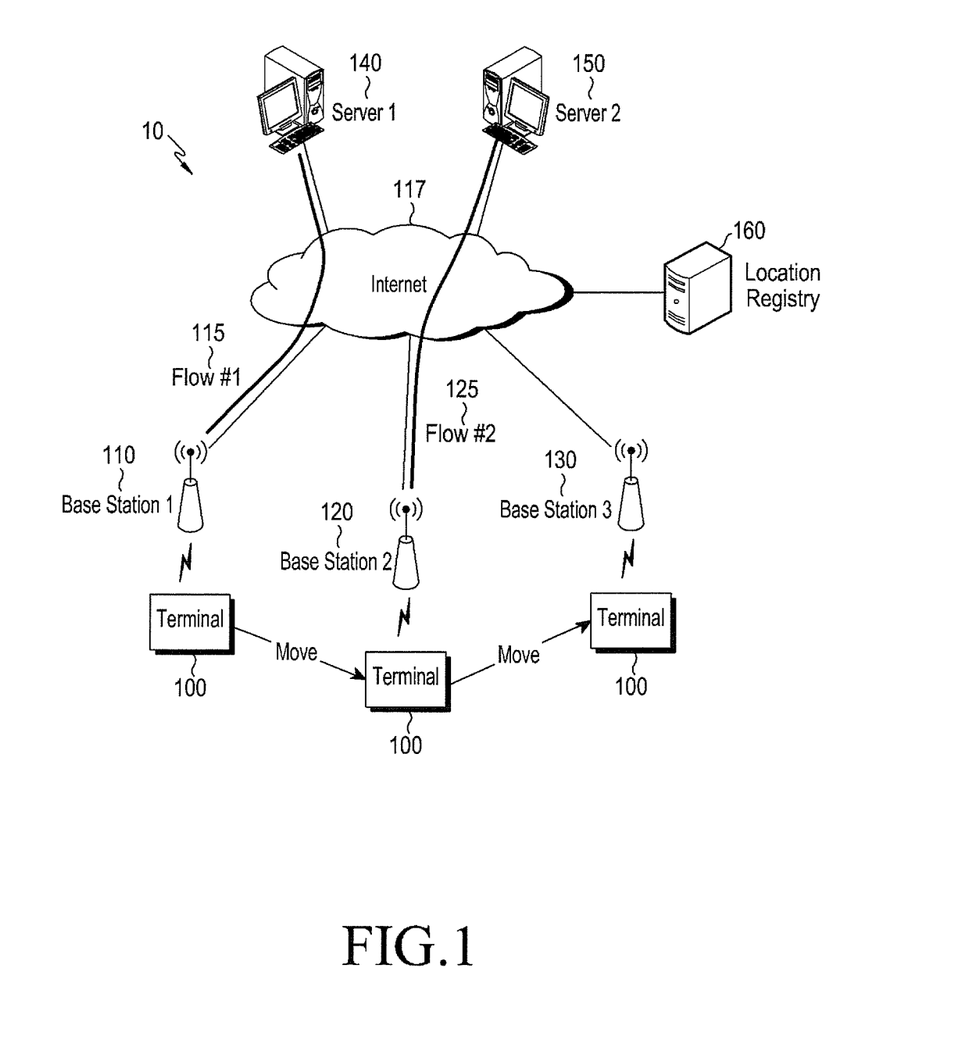
FIG. 1 illustrates a configuration of a communication system according to an exemplary embodiment of the present disclosure.

FIG. 1 illustrates a configuration of a communication system according to an exemplary embodiment of the present disclosure.

Referring to FIG. 1, a communication system 10 according to an exemplary embodiment of the present disclosure may include a plurality of base stations 110, 120 and 130, a terminal 100 capable of communicating with each of the plurality of base stations 110, 120 and 130, and a location registry (also known as a location server) 160, and may also include a plurality of servers 140 and 150 that communicate with the terminal 100 over the Internet 117. It is assumed in FIG. 1 that the communication system 10 includes three base stations 110, 120 and 130, the terminal 100 that has mobility and communicates with one of the three base stations 110, 120 and 130 depending on the terminal's 100 location, and two servers 140 and 150.

Each of the first to third base stations 110, 120 and 130 may include an Access Router (AR), a Mobile Access Gate (MAG), a Local Mobility Anchor (LMA), a Home Agent (HA) and a Foreign Agent (FA), and perform a routing function and a mobility agent function. The terminal 100 may access one of the first to third base stations 110, 120 and 130, and in the following description, it is assumed that the terminal 100 has accessed the first base station 110.

If the terminal 100 accesses the first base station 110, the first base station 110 may assign an Internet Protocol (IP) address (e.g., Home of Address (HoA)) to the terminal 100. Using the HoA assigned from the first base station 110, the terminal 100 may establish a session to a server (e.g., the first server 140 and the second server 150) that communicates with the terminal 100 over the Internet 117. For example, the terminal 100 may establish a first session 115 to the first server 140 using the HoA assigned from the first base station 110. If the terminal 100 moves to a cell managed by the second base station 120, the terminal 100 may be assigned a HoA from the second base station 120, and establish a second session 125 to the second server 150 using the assigned HoA. In this case, the first base station 110 and the second base station 120 each serving as an end of IP communication may forward data transmitted from the first server 140 and the second server 150 to the terminal 100, respectively. The first base station 110 and the second base station 120 may each be a Home Anchor (HA), and may be called a first HA and a second HA, respectively.

The first HA 110 and the second HA 120 may track the current location of the terminal 100 to ensure the continuity of the IP session, and forward data to a base station (e.g., the third base station 130) that manages the cell where the terminal 100 is currently located. The third base station 130 managing the cell where the terminal 100 is currently located may finally transmit the forwarded data to the terminal 100. The third base station 130 managing the cell where the terminal 100 is currently located may be a Foreign Anchor (FA).

The terminal 100 may transmit to the first HA 110 and the second HA 120 a Binding Update message including information about an IP address assigned from the third base station 130. Then, the first HA 110 and the second HA 120 may perform binding update depending on the received Binding Update message. After performing binding update, the first HA 110 and the second HA 120 may generate a tunnel for communication with the third base station 130, and transmit data for the terminal 100 to the third base station 130 through the tunnel. Accordingly, the third base station 130 may finally forward the received data to the terminal 100.

The location registry 160 is a centralized server, and may manage the location of the terminal 100. If the terminal 100 moves to another cell, the location registry 160 may receive a Binding Update message including information about an IP address assigned from the third base station 130 managing the cell where the terminal 100 is currently located. The location registry 160 may perform binding update depending on the received Binding Update message. The location registry 160 may provide the location information of the terminal 100 to the first HA 110 and the second HA 120 having data to transmit to the terminal 100. Accordingly, the first HA 110 and the second HA 120 may transmit the data through the tunnel for communication with the third base station 130 managing the cell where the terminal 100 is currently located.

Figure 2:
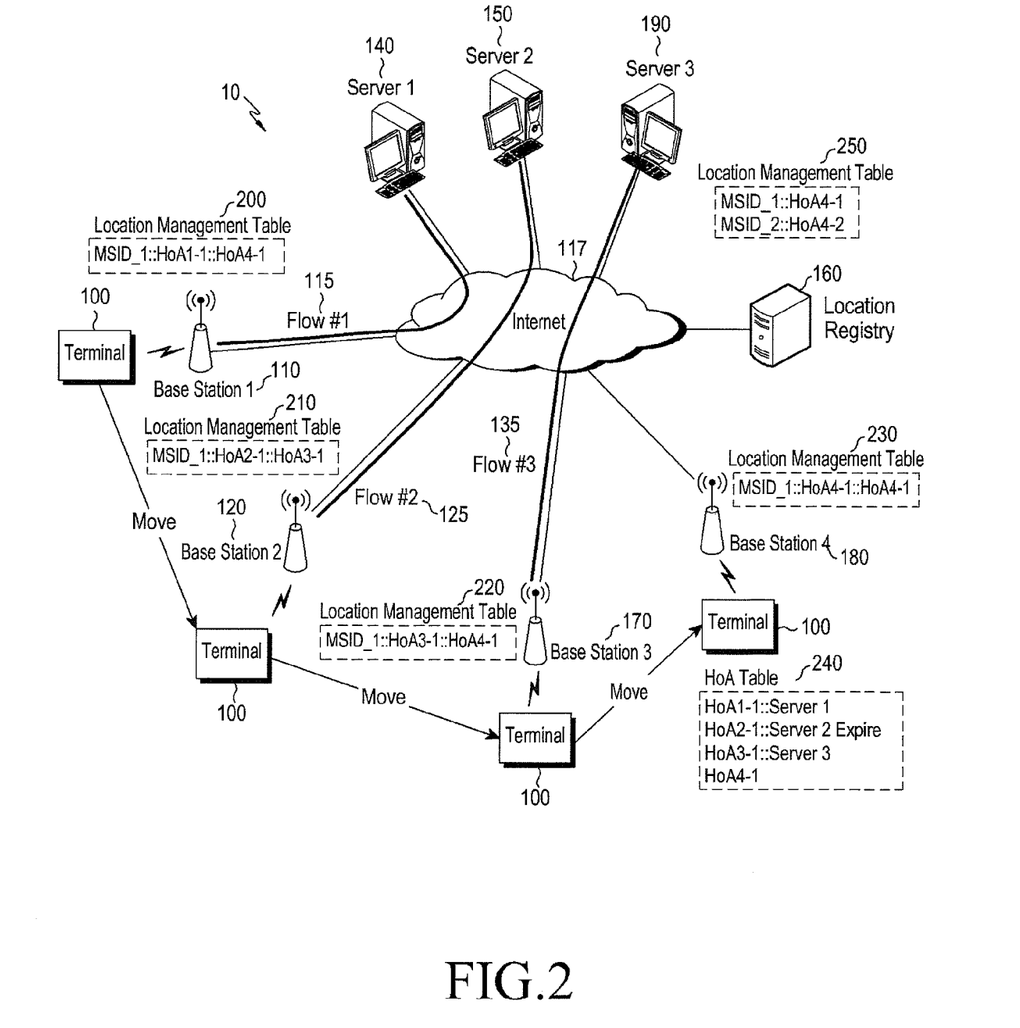
FIGS. 2 and 3 illustrate an operation of a communication system according to an exemplary embodiment of the present disclosure.
Figure 3:
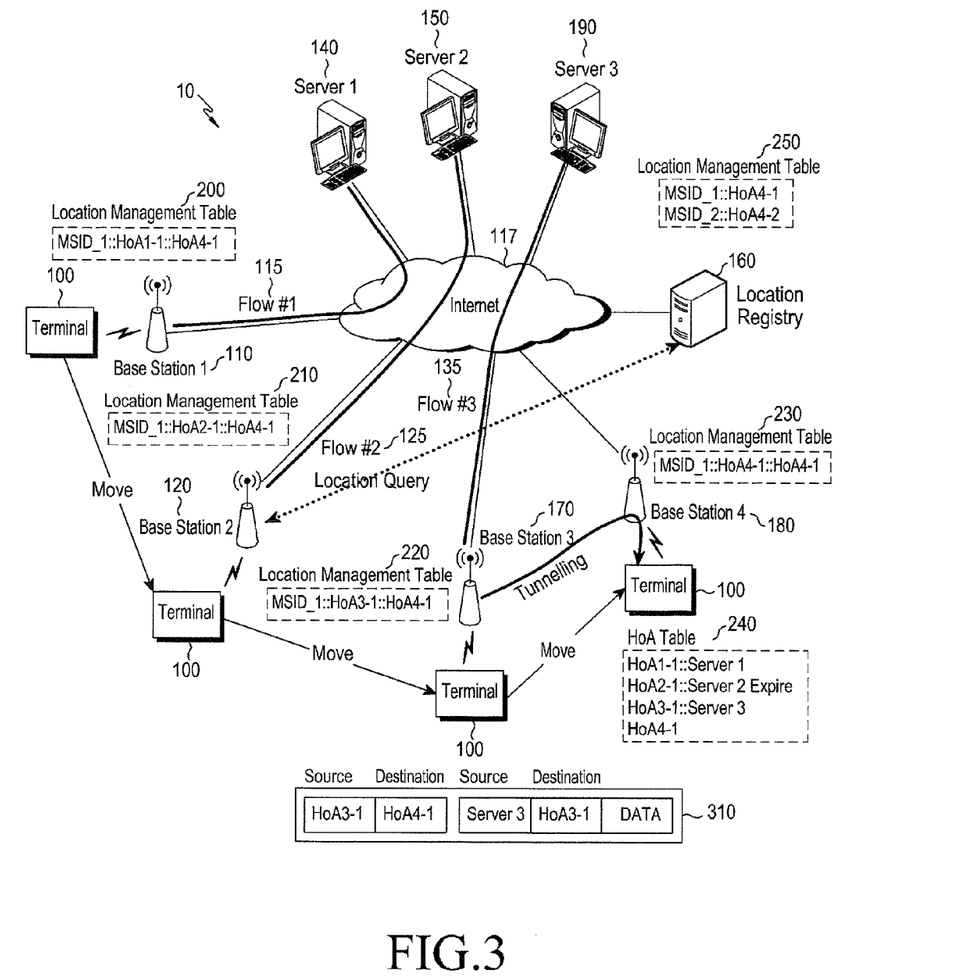

FIGS. 2 and 3 illustrate an operation of a communication system according to an exemplary embodiment of the present disclosure.

It is assumed in FIG. 2 that the terminal 100 establishes the first session 115 to the first server 140 in a cell managed by the first base station 110, establishes the second session 125 to the second server 150 in a cell managed by the second base station 120, and establishes a third session 135 to a third server 190 in a cell managed by a third base station 170, and the first to third base stations 110, 120 and 170 may each be a HA.

The first to fourth base stations 110, 120, 170 and 180 may generate location management tables 200, 210, 220 and 230 for the terminal 100, respectively, to manage the terminal 100 which is anchored by the base stations themselves, and to forward data. Entries of the location management tables 200, 210, 220 and 230 may be configured in the form of, for example, [MSID::assigned HoA::current location of terminal].

Each entry included in the location management table may include a timer. Binding update needs to be performed before the timer expires, and if binding update is performed before expiration of the timer, the timer may be initialized. However, if binding update fails to be performed before expiration of the timer, the first to third base stations 110, 120 and 170 each serving as an HA may obtain location information of the terminal 100 from the location registry 160 and transmit data to the terminal 100 based on the location information. If an available period of the session expires, an entry for the session may be deleted from the location management table, and an IP address assigned to the terminal 100 may be assigned to another terminal.

In a location management table 250 that the location registry 160 has generated to manage the location of the terminal 100, may be bound an MSID which is an Identifier (ID) of the terminal 100, and information about a HoA that the terminal 100 is assigned from the base station that the terminal 100 is currently accessing. For example, in FIG. 2, the terminal 100 may be currently located in a cell managed by the fourth base station 180, and transmit a Binding Update message including a HoA 4-1 assigned from the fourth base station 180 to the location registry 160, thereby allowing the location registry 160 to update information about the terminal 100 in the location management table 250 to [MSID 1::HoA 4-1] through a binding update process.

The terminal 100 may generate a HoA table 240 to manage HoAs. Each entry included in the HoA table 240 may include a HoA and an IP address of a server that has established a session to the terminal 100, and may include a timer. A value of the timer may be differently set based on Quality of Service (QoS) of the session. For example, as a packet delay budget is less, a value of the timer may be set greater. The timer value may be initialized every time the terminal 100 receives data in the session, and the terminal 100 may periodically update each entry value of the HoA table 240 unless the timer expires.

Using the timer, the terminal 100 may determine whether to transmit a Binding Update message. While located in a cell managed by a specific HA, the terminal 100 may fail to receive data through a session formed for the HA before a timer expires. In this case, if the terminal 100 moves to a cell managed by another base station, no Binding Update message may be transmitted to the HA.

For example, in FIG. 2, when located in a cell managed by the third base station 170, the terminal 100 may receive data from the first base station 110 and the third base station 170 before the timer expires, but may fail to receive data from the second base station 120 before the timer expires. In this case, if the terminal 100 moves from the third base station 170 to the fourth base station 180, the terminal 100 may transmit a Binding Update message including a HoA 4-1 assigned from the fourth base station 180 to the first base station 110 and the third base station 170, but may fail to transmit the Binding Update message to the second base station 120.

Therefore, the location management tables of the first base station 110 and the third base station 170 may include the HoA 4-1 assigned to the terminal 100 by the fourth base station 180, but the location management table of the second base station 120 may not include the HoA 4-1, and instead include a HoA 3-1 that the third base station 170 assigned to the terminal 100 before the binding update. In this case, if binding update is not performed before expiration of the timer and if there is data to transmit to the terminal 100, the second base station 120 may determine the current location of the terminal 100 by obtaining the location information of the terminal 100 from the location registry 160. In order words, in FIG. 3, the second base station 120 may update the location management table 210 of the terminal 100 by obtaining from the location registry 160 the HoA 4-1 that the fourth base station 180 assigned to the terminal 100.

The terminal 100 may periodically transmit a Binding Update message to a HA even when the terminal 100 moves to a cell managed by another base station. If the terminal 100 fails to receive data through a session established to a specific HA in the terminal's 100 location before the timer expires, the terminal 100 may not transmit a Binding Update message to the HA after the timer expires.

A procedure for transmitting data to the terminal 100 in the environment of FIG. 2 is described in detail with reference to FIG. 3.

In a case where the third server 190 transmits data to the terminal 100 through the third session 135 established to the third base station 170, the data may be transmitted to the third base station 170 because a recipient's address for the data is set as HoA 3-1. Upon receiving the data, the third base station 170 may set a sender's address for the data as the HoA 3-1 the third base station 170 assigned to the terminal 100, based on the third base station's 170 location management table 220, and may set a recipient's address for the data as the HoA 4-1 that the fourth base station 180 assigned to the terminal 100. The third base station 170 may transmit to the terminal 100 the data whose sender's address and recipient's address are set as above. In this case, a tunnel may be created between the third base station 170 and the fourth base station 180.

When transmitting data to the third server 190, the terminal 100 may set a sender's address for the data as the HoA 4-1 assigned from the fourth base station 180, set a recipient's address for the data as the HoA 3-1 assigned from the third base station 170, and transmit the data to the third base station 170. Then, the third base station 170 may receive the data and transmit the received data to the third server 190.

Data transmission/reception among the first server 140, the first base station 110, the fourth base station 180 and the terminal 100 may also be performed in the aforesaid method.

The second server 150 may transmit data to the terminal 100 through the second base station 120. In this case, upon receiving a data packet from the second server 150, the second base station 120 may transmit a Location Information Request message to the location registry 160 to obtain location information for the terminal 100. The second server 150 may receive location information of the terminal 100 from the location registry 160, and update the location management table 210 of the second base station 120 using the received location information. Then, the second server 150 may forward the data to the terminal 100 through tunneling to the fourth base station 180.

Figure 4:
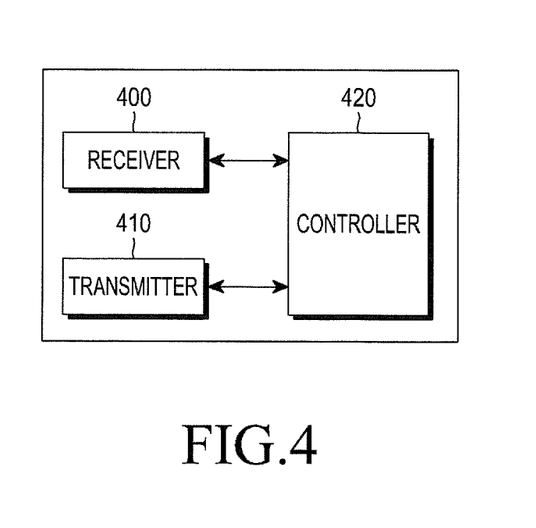
FIG. 4 illustrates a structure of a base station according to an exemplary embodiment of the present disclosure.

FIG. 4 illustrates a structure of a base station according to an exemplary embodiment of the present disclosure.

The base station illustrated in FIG. 4 may be at least one of the aforesaid multiple base stations 110, 120, 130, 170 and 180 according to an exemplary embodiment of the present disclosure.

Referring to FIG. 4, the base station may include a receiver 400, a transmitter 410 and a controller 420. The receiver 400 may receive data from the first to third servers 140, 150 and 190, and the location registry 160. The transmitter 410 may transmit data to the terminal 100. The controller 420 may assign an address to the terminal 100, establish a session to a server that communicates with the terminal 100 over the Internet 117, using the assigned address, and perform an operation of managing and updating the address of the terminal 100. In this way, the controller 420 may control the overall operation of the base station according to an exemplary embodiment of the present disclosure.

Figure 5:
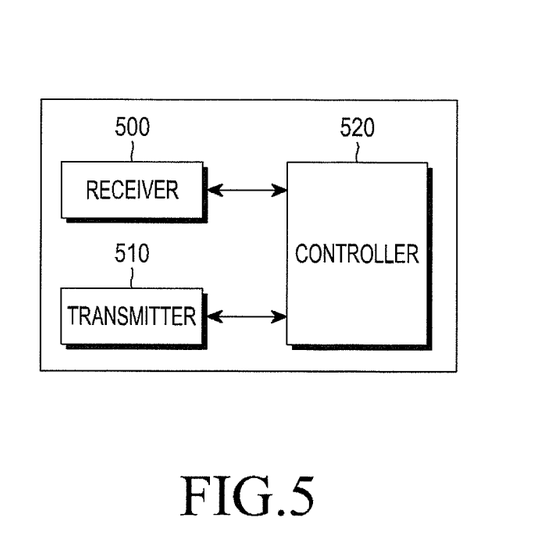
FIG. 5 illustrates a structure of a terminal according to an exemplary embodiment of the present disclosure.

FIG. 5 illustrates a structure of a terminal according to an exemplary embodiment of the present disclosure.

Referring to FIG. 5, the terminal may include a receiver 500, a transmitter 510 and a controller 520. The receiver 500 may receive data from any one of the multiple base stations 110, 120, 130, 170 and 180. The transmitter 510 may transmit data to any one of the multiple base stations 110, 120, 130, 170 and 180. The controller 520 may be assigned an address from another cell as the terminal moves to another cell, and may transmit information about the assigned address to a base station. In this manner, the controller 520 may control the overall operation of the terminal according to an exemplary embodiment of the present disclosure.

Figure 6:
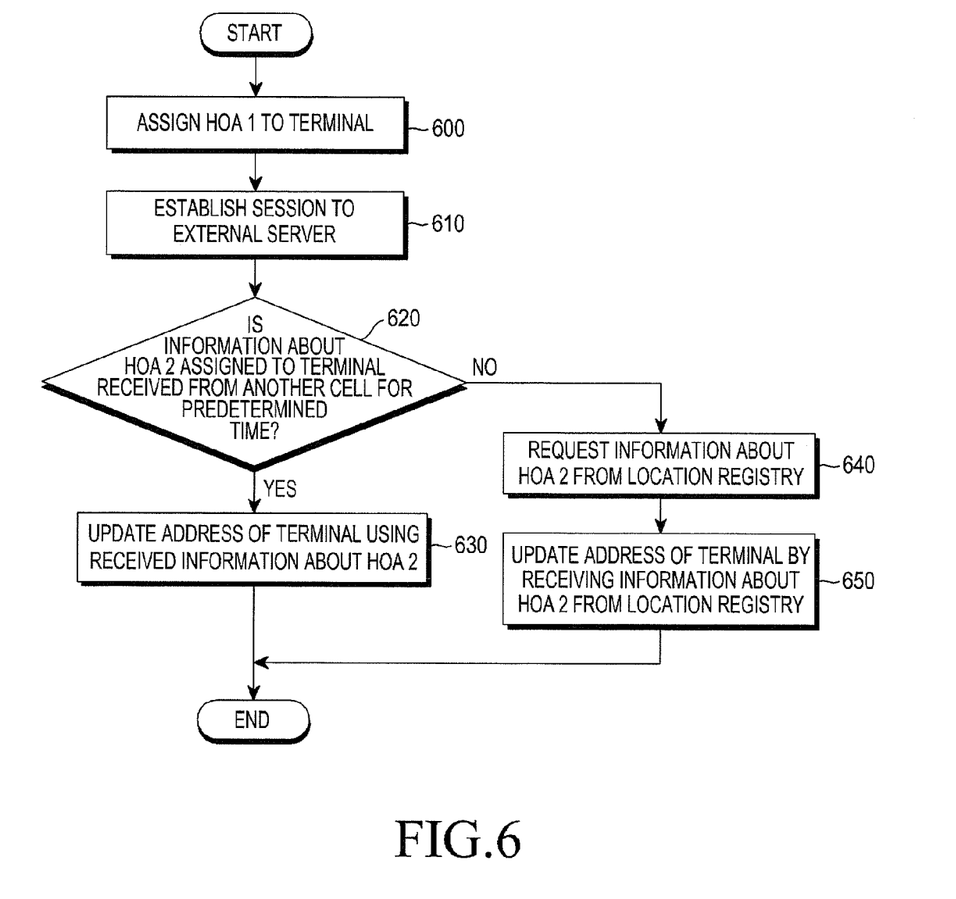
FIG. 6 is a flowchart illustrating an operation of a base station according to an exemplary embodiment of the present disclosure.

FIG. 6 is a flowchart illustrating an operation of a base station according to an exemplary embodiment of the present disclosure. Although an operation of, for example, the first base station 110 is described in FIG. 6, the same or similar operation may be performed in any other base stations.

Referring to FIG. 6, if the terminal 100 is located in a cell managed by the first base station 110, the first base station 110 may assign a first HoA to the terminal 100 (600). The first base station 110 may establish a session to the first server 140 that communicates with the terminal 100 over the Internet 117 (610).

Thereafter, if the terminal 100 moves to a cell managed by another base station, the first base station 110 may monitor or determine whether information about a second HoA assigned to the terminal 100 by another base station is received within a predetermined time (620). Upon receiving information about the second HoA within a predetermined time, the first base station 110 may update the address of the terminal 100 using the received information about the second HoA (630).

However, in a case where information about the second HoA is not received within a predetermined time, the first base station 110 may request information about the second HoA from the location registry 160, if there is data to transmit to the terminal 100 (i.e., if the first server 140 transmits data to the terminal 100) (640). Subsequently, the first base station 110 may receive information about the second HoA from the location registry 160, and update the address of the terminal 100 based on the received information about the second HoA (650).

Figure 7:
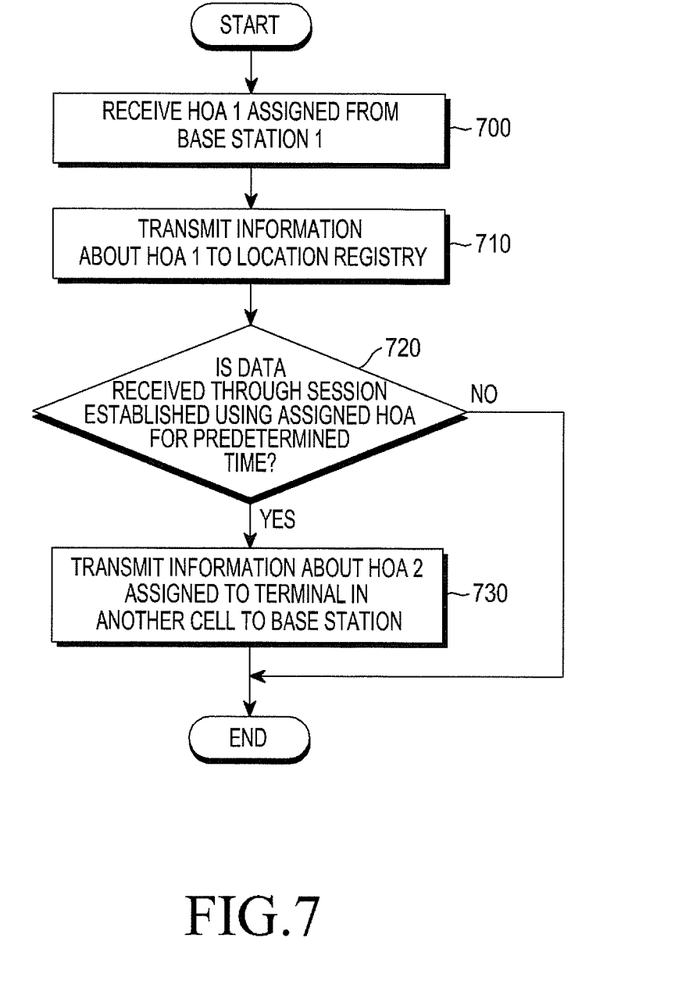
FIG. 7 is a flowchart illustrating an operation of a terminal according to an exemplary embodiment of the present disclosure.

FIG. 7 is a flowchart illustrating an operation of a terminal according to an exemplary embodiment of the present disclosure. Although an operation of the terminal 100, which is located in a cell managed by, for example, the first base station 110, is described in FIG. 7, the same or similar operation may be performed even when the terminal 100 is located in a cell managed by another base station.

Referring to FIG. 7, if the terminal 100 is located in a cell managed by the first base station 110, the terminal 100 may be assigned a first HoA from the first base station 110 (700). The terminal 100 may transmit information about the first HoA to the location registry 160 (710). Thereafter, the terminal 100 may monitor or determine whether data is received through a session established using the assigned first HoA is received within a predetermined time (720). If the terminal 100 moves to a cell managed by another base station after data is received within the predetermined time, the terminal 100 may be assigned a second HoA from another base station. Then, the terminal 100 may transmit information about the assigned second HoA to the first base station 110 (730).

As is apparent from the foregoing description, the base station according to an exemplary embodiment of the present disclosure may perform binding update by receiving a Binding Update message from the terminal, or obtaining location information of the terminal from the location registry. Therefore, when using a session susceptible to delay such as Voice over Internet Protocol (VoIP), the base station may perform binding update based on the Binding Update message received from the terminal, thereby minimizing the communication delay that the user may experience. In the environment where traffic that is less susceptible to delay is transmitted and received, such as web browsing or keep alive of a push service, the base station may perform binding update based on the location information of the terminal, which is obtained from the location registry, thereby reducing the frequency of performing binding update, thus contributing to a reduction in the power consumption of the terminal and the network congestion.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing mobility of a terminal by a first base station in a communication system, the method comprising;
    assigning a first address to the terminal located in a first cell managed by the first base station and initiating a timer, and establishing a session to a data server that communicates with the terminal based on the first address;
    if the terminal moves to a second cell managed by a second base station different from the first base station, determining whether information related to a second address assigned to the terminal by the second base station is received before the timer expires;
    if the information related to the second address is received before the timer expires, transmitting data received from the data server to the terminal through the second base station based on the information related to the second address and resetting the timer; and
    if the information related to the second address is not received before the timer expires, querying a location server for the second address of the terminal,
    wherein the information related to the second address is received from the terminal if the terminal receives data from the first base station within a predetermined time before the terminal moves to the second cell.

2. The method of claim 1, further comprising:
    transmitting a request message for requesting the information related to the second address to the location server managing an address of the terminal, if the information related to the second address is not received before the timer expires; and
    if the information related to the second address is received from the location server, transmitting data received from the data server to the terminal through the second base station based on the information related to the second address received from the location server.

3. The method of claim 1, further comprising:
    if the information related to the second address is received before the timer expires, updating a location management table including an identifier (ID) of the terminal and the first address so that the location management table includes the ID of the terminal, the first address, and the second address; and
    wherein the ID of the terminal and the second address included in the location management table are deleted, if the established session is terminated.

4. The method of claim 1, wherein the first address is used to receive data from the data server, and the second address is used to transmit data received from the data server to the second base station.

5. The method of claim 1, wherein the timer is determined based on quality of service (QoS) of the session.

6. A method for transmitting information for mobility management by a terminal in a communication system, the method comprising:
    receiving information related to a first address, assigned from a first base station and initiating a timer if the terminal is located in a first cell managed by the first base station;
    receiving data provided by a data server from the first base station based on the information related to the first address;
    if the terminal moves to a second cell managed by a second base station different from the first base station, receiving a second address assigned by the second base station;
    determining whether the data is received from the first base station within a predetermined time before the terminal moves to the second cell;
    if the data is received from the first base station within the predetermined time, transmitting the information related to the second address to the first base station; and
    receiving data provided by the data server through the first base station from the second base station based on the information related to the second address.

7. The method of claim 6, further comprising:
    if the information related to the second address is not transmitted to the first base station before the timer expires, transmitting the information related to the second address to a location server managing an address of the terminal so that the first base station receives the information related to the second address from the location server.

8. The method of claim 6, wherein if the information related to the second address is transmitted to the first base station before the timer expires, a location management table managed by the first base station and including an identifier (ID) of the terminal and the first address is updated to include the ID of the terminal, the first address, and the second address, and
    wherein the ID of the terminal and the second address included in the location management table are deleted, if a session which is established to the data server based on the information related to the first address is terminated.

9. The method of claim 6, wherein the first address is used to receive data from the data server, and the second address is used to transmit data received from the data server to the second base station.

10. The method of claim 6, wherein the timer is determined based on quality of service (QoS) of a session.

11. A first base station in a communication system, the first base station comprising:
    a receiver;
    a transmitter; and
    a processor configured to:
        assign a first address to a terminal located in a first cell managed by the first base station and initiate a timer, and establish a session to a data server that communicates with the terminal based on the first address;
        if the terminal moves to a second cell managed by a second base station different from the first base station, determine whether information related to a second address assigned to the terminal by the second base station is received at the receiver before the timer expires;

if the information related to the second address is received before the timer expires, control the transmitter to transmit data received from the data server to the terminal through the second base station based on the information related to the second address and reset the timer; and if the information related to the second address is not received before the timer expires, query a location server for the second address of the terminal, wherein the information related to the second address is received from the terminal if the terminal receives data from the first base station within a predetermined time before the terminal moves to the second cell.

12. The first base station of claim 11, wherein the processor is configured to:

control the transmitter to transmit a request message for requesting the information related to the second address from the location server managing an address of the terminal if the information related to the second address is not received before the timer expires; and if the information related to the second address is received from the location server, transmit data received from the data server to the terminal through the second base station based on the information related to the second address received from the location server.

13. The first base station of claim 11, wherein:

if the information related to the second address is received before the timer expires, the processor is configured to update a location management table including an identifier (ID) of the terminal and the first address so that the location management table includes the ID of the terminal, the first address and the second address, and wherein the ID of the terminal and the second address included in the location management table are deleted, if the established session is terminated.

14. The first base station of claim 11, wherein the first address is used to receive data from the data server, and the second address is used to transmit data received from the data server to the second base station.

15. The first base station of claim 11, wherein the timer is determined based on quality of service (QoS) of the session.

16. A terminal in a communication system, the terminal comprising:

a receiver;

a transmitter; and a processor configured to:

control the receiver to receive information related to a first address assigned from a first base station if the terminal is located in a first cell managed by the first base station;

control the receiver to receive data provided by a data server from the first base station through the receiver based on the information related to the first address;

if the terminal moves to a second cell managed by a second base station different from the first base station, receive a second address assigned by the second base station;

determine whether the data is received from the first base station within a predetermined time before the terminal moves to the second cell;

if the data is received from the first base station within the predetermined time, control the transmitter to transmit the information related to the second address to the first base station; and control the receiver to receive data provided by the data server through the first base station from the second base station based on the information related to the second address.

17. The terminal of claim 16, wherein if the information related to the second address is not transmitted to the first base station before a timer expires, the processor is configured to transmit the information related to the second address to a location server managing an address of the terminal so that the first base station receives the information related to the second address from the location server.

18. The terminal of claim 16, wherein if the information related to the second address is transmitted to the first base station before a timer expires, a location management table managed by the first base station and including an identifier (ID) of the terminal and the first address is updated to include the ID of the terminal, the first address, and the second address, and wherein the ID of the terminal and the second address included in the location management table are deleted, if a session which is established to the data server based on the information related to the first address is terminated.

19. The terminal of claim 18, wherein the first address is used to receive data from the data server, and the second address is used to transmit the data received from the data server to the second base station.

20. The terminal of claim 16, wherein a timer is determined based on quality of service (QoS) of a session.

* * * * *